US012590893B2

(12) United States Patent
Cheung et al.

(10) Patent No.: US 12,590,893 B2
(45) Date of Patent: Mar. 31, 2026

(54) FORWARD AND BACK SCATTERING SMOKE DETECTOR AND METHOD OF USE

(71) Applicant: Potter Electric Signal Company, LLC, Hazelwood, MO (US)

(72) Inventors: Wilson Cheung, Long Grove, IL (US); Zhong Hua Wang, Xi'an (CN); Ming Jie Chen, Xi'an (CN); Fu Sheng Zhang, Xi'an (CN)

(73) Assignee: Potter Electric Signal Company, LLC, Hazelwood, MO (US)

( * ) Notice: Subject to any disclaimer, the term of this patent is extended or adjusted under 35 U.S.C. 154(b) by 552 days.

(21) Appl. No.: 17/188,753

(22) Filed: Mar. 1, 2021

(65) Prior Publication Data

US 2022/0276163 A1 Sep. 1, 2022

(51) Int. Cl.
G01N 21/53 (2006.01)

(52) U.S. Cl.
CPC .................................... G01N 21/53 (2013.01)

(58) Field of Classification Search
CPC .......... G01N 21/53; G01N 2021/4711; G08B 17/107
See application file for complete search history.

(56) References Cited

U.S. PATENT DOCUMENTS

| | | | | |
|---|---|---|---|---|
| 4,584,485 | A | * 4/1986 | Powers | ................ G08B 17/107 |
| | | | | 250/239 |
| 5,280,272 | A | 1/1994 | Nagashima et al. | |
| 6,011,478 | A | 1/2000 | Suzuki et al. | |
| 6,218,950 | B1 | * 4/2001 | Politze | ................ G08B 17/107 |
| | | | | 340/630 |
| 2016/0335868 | A1 | * 11/2016 | Schmidt | .............. G08B 17/107 |
| 2021/0233374 | A1 | * 7/2021 | Walker | ................... H04R 17/00 |

FOREIGN PATENT DOCUMENTS

| | | | |
|---|---|---|---|
| JP | 06-109631 | A | 4/1994 |
| JP | 2001236575 | A * | 8/2001 |
| JP | 2004325211 | A * | 11/2004 |
| JP | 2016-114959 | A | 6/2016 |
| KR | 10-1963111 | B1 | 7/2019 |
| KR | 10-2019-0131364 | A | 11/2019 |
| RU | 177379 | U1 * | 2/2018 |

OTHER PUBLICATIONS

International Search Report and Written Opinion issued for International Application No. PCT/US2022/018374 dated Jun. 15, 2022, 13 pages.

* cited by examiner

*Primary Examiner* — Uzma Alam
*Assistant Examiner* — Mohamed Doumbia
(74) *Attorney, Agent, or Firm* — LEWIS RICE LLC

(57) ABSTRACT

Systems and methods for smoke detection which utilizes two generally identical light sources and single light detector to compare the ratio of forward and backward scattering smoke particles present in a detection area.

20 Claims, 4 Drawing Sheets

FORWARD AND BACK SCATTERING SMOKE DETECTOR AND METHOD OF USE

BACKGROUND OF THE INVENTION

Field of the Invention

This disclosure relates to smoke detectors. Specifically, to smoke detectors that are better able to segregate nuisance smoke, such as from cooking, from smoke from an alarm worthy fire, such as a structural fire.

Description of the Related Art

To fight fires in modern buildings, firefighters use a wide variety of tools but are also regularly aided by systems within the building. One of the most well-known fire systems are smoke detectors. Smoke detectors, while they don't actually fight a fire, are near ubiquitous in modern buildings and act to detect when there is smoke in the air. As the old axiom goes: "where there is smoke, there is fire." Thus, the detection of smoke is intended to provide advance warning to occupants of a fire and can allow for evacuation of the building and notification of firefighting personnel automatically and quickly.

While the exact effectiveness of smoke alarms has been debated, it is clear that they do save lives, particularly when fires start while occupants are asleep. At the same time, the effectiveness of smoke detectors is also dependent on their ability to accurately detect the presence of smoke from a dangerous fire early. It should be recognized that the simple presence of smoke does not require a smoke detector to activate. There are many situations where smoke can be present in a structure without the occupants needing to be made aware of it. For example, the smoke can be from an activity that the occupants are actively carrying out (for example cooking or heating using a fireplace). Further, occupants that are aware of and can see a large fire or smell the related smoke will typically know to react to the fire without needing a smoke detector to warn them. Instead, the primary purpose of a smoke detector can be considered warning occupants that a fire exists they would not otherwise know about in time to effectively respond. This response can be by bringing firefighting materials to bear, or simply by escaping. This type of warning is most commonly awakening sleeping occupants with a distinct alarm they recognize as indicating a potential fire.

Originally, smoke detectors utilized a radioisotope to ionize air. The difference in ionization characteristics due to smoke in the air can be detected and result in an alarm. Specifically, in order to detect the difference, an ionization alarm utilizes two separate chambers. One is open to the neighboring environment while the other is sealed. Ionization of the air occurs in both chambers in similar fashion. If there is no smoke present in the open chamber, ionized particles travel in similar fashion in both chambers. However, the presence of smoke in the open chamber interferes with ionized particles travelling across the open chamber compared to the sealed one. That, in turn, results in a detectable electric difference between the two chambers and an alarm situation.

An alternative to ionization detectors are photoelectric or optical smoke detectors. Traditionally, these operated according to a similar principle of detecting the particles of smoke in the air to that used by ionization detectors. However, instead of ionizing the air, they simply shone light through it to a detector which was directly across the chamber from the light source. The light is then expected to be blocked or bounce off of particles in the air from smoke. This deflection can be detected as a decrease in light reaching the photodiode or similar light detector. A sufficient break in light (representing sufficient deflection) is indicative of smoke in the air and an alarm situation.

A problem with both ionization and early photoelectric detectors is that smoke is not a consistent material. Smoke, as a by-product of combustion, is made up of a large quantity of different types of particles and materials and its composition is typically very dependent on the material being combusted and the nature of the combustion occurring. For example, most people are familiar with the fact that placing a large mass of wet materials (wood, straw, leaves, or similar material) on a campfire will produce large masses of dark smoke. However, the same fire burning dry tinder will typically produce a much lighter colored and thinner smoke. The color occurs, in this case, as the combustion of wet materials is typically incomplete, and, thus, large particles of the fuel are released and pushed outward due to the convection currents in the air from the fire creating the thick dark smoke. Lighter smoke is created when more complete combustion occurs.

It should be recognized that the two types of fire alarms discussed above do not specifically detect smoke as much as they detect a presence of particles in the air. They both work because such particles inhibit the propagation of material (ionization energy or light) through the air. They can, thus, be triggered in a variety of false alarm situations where there are particles in the air that are not smoke. As a simple example, both systems can readily trigger in the presence of water vapor or other aerosols in the air. Further, both types of detectors are typically more sensitive to flaming fires than smoldering fires as flaming fires tend to produce smoke with larger particles, and a greater amount of them.

The concern with such detection is that the presence of large particles in smoke is often more an indicator of a nuisance fire than an actual risk to occupants. For example, smoke from an oven that has burned dinner or from burning food on a stove is likely to produce substantial smoke with large particles due to incomplete combustion (amongst other factors). However, smoke from a cooking fire typically doesn't need to be detected (and trigger the smoke detector to alarm) as it is unlikely to represent a fire occupants are unaware of. Instead, a smoke alarm which triggers in this situation is likely to be considered a nuisance that needs to be silenced. However, if such a smoke generation situation persists, it may result in an actual fire as the cooking fire may not have been known. The detector should be intelligent enough to react in this situation when a nuisance could actually turn into a real fire.

An actual structural fire will typically start small and smolder for awhile. These fires will typically only produce flame as they grow. The movement (propagation) of fire generally is dependent on the existence of a front where heat is sufficient to maintain combustion. As that front grows, the speed of combustion can accelerate as more fuel (and oxygen) are available. It should be recognized that one of the primary reasons to have a smoke alarm is to awaken sleeping occupants when there is a fire present they are otherwise unaware of to allow them to recognize that the fire is present in time for them to escape before they are overcome by heat or chemicals. Most death due to fire is effectively caused by smoke inhalation and associated damage to the body. Particularly in the case of carbon monoxide poisoning (carbon monoxide is produced by combustion of any organic material) the effects of exposure to the smoke can make an occupant less able to respond to it.

If occupants are already awake when a fire starts, they may very well smell or see smoke long before it will reach a smoke detector and can readily escape the fire by leaving the structure. When all occupants are asleep, however, they are much more dependent on the smoke detector as their internal detection is not nearly as active and they can be overcome by smoke inhalation before they can awaken. As a smoldering fire may be an earlier stage of a potentially dangerous fire while flame is often indicative of a larger fire, smoldering fires are often of more interest to detect as they are more likely to be unknown to building occupants. Further, when a fire is detected early it allows occupants a greater time to respond and escape. Finally, a smoldering fire is less likely to be caused by a situation that the occupants are already aware of.

It should be recognized that one of the problems in the use of smoke detectors is their triggering of an alarm in conjunction with "nuisance" fires (such as the examples given above). Smoke alarm triggering when the fire is known (and under control) can result in their deactivation against future, alarm worthy, fires. Nuisance fires, as discussed above, are typically known about and, therefore, there is no need to notify occupants of their existence for that reason. Smoke detectors are ideally intended to detect otherwise undetected fires such as when occupants are asleep or the fire occurs in an area where the occupants are not present.

Nuisance alarms are a problem because the alarm of a smoke detector is typically purposefully loud and uncomfortable to hear as it is designed to wake up sleeping occupants and quickly alert them to danger by it being an uncomfortable sound to listen to. However, because the alarm is designed to be uncomfortable to listen to, smoke detectors that trigger too often with nuisance alarms are regularly disconnected by occupants to silence the alarm. The problem is that a disconnected smoke detector is useless and occupants can forget to reconnect them or simply lose faith in their effectiveness versus their annoyance and leave them disconnected. Thus, it is important that smoke detectors not alarm to nuisance fires while still alarming to fires where an alarm is appropriate. Further, in commercial buildings, nuisance alarms can result in notifications to a central alarm station which can contact a fire station directly without a alarm necessarily sounding in the building. This can result in a substantial waste of resources or even a dangerous situation where firefighting resources are called away from a real fire to respond to a nuisance. Such cases where an alarm is appropriate are called "real" fires herein even though it is recognized that all fires are "real" and can always be dangerous.

In order to deal with nuisance alarms from nuisance fires, while still allowing adequate warning when a dangerous real fire situation exists, there have been a number of formal requirements proposed and imposed on smoke detectors related to their ability to segregate nuisance fires from real fires. Typically, these improvements are focused on allowing the smoke detector to react quicker to the detection of real fires while not reacting to nuisance fires. These standards are typically considered codified in Underwriter's Laboratory (UL) standards 217 and 268 (7<sup>th</sup> Edition) and National Fire Protection Association (NFPA) standard 72.

The new UL standards specifically introduced three (3) new detection performance tests. These new tests include a flaming polyurethane foam test, a smoldering polyurethane foam test, and a cooking nuisance test. Due to the extent of the new and revised requirements, UL has indicated that new requirements will have a major impact on all currently listed smoke detectors and anticipates that all older smoke detectors (which were manufactured to the 6th Edition standards) will need to be re-designed to meet the requirements outlined in the 7th Edition. The new flaming and smoldering polyurethane tests were added to ensure that newly manufactured smoke detectors perform adequately and in a timely manner when installed in modern building construction environments.

In these standards, types of fires are distinguished by the types of materials that are burned. For example, the latest versions take into account the differences in furnishings in a modern structure versus one from the 1970's (when the prior versions of the standards were developed). They, thus, require fast detection (and alarm) within a certain time limit when exposed to the smoke from real fires as represented by flaming or smoldering polyurethane, which is present in vastly more furniture today and particularly furniture within bedrooms. They also have to react to other burning and smoldering materials such as wood. Further, the tests also now require smoke detectors to not alarm (for at least a specific window of time) when exposed to nuisance fires as represented by burning hamburger. This allows for smoke detectors to be placed closer to or within kitchens (where prior NFPA standards excluded them due to the problems with nuisance alarms) and will hopefully result in fewer disconnections due to nuisance alarms being generated.

It has been recognized that one of the best ways to distinguish between nuisance and real fires is by detecting the sizes of particles within the smoke. In particular, nuisance fires (as represented by burning hamburger, where a smoke detector should not issue an alarm) are considered to have a much greater quantity of larger particles (typically those from about one-half to one micron in diameter). At the same time real fires (as represented by burning or smoldering polyurethane, where a smoke detector should quickly issue an alarm) include a greater number of smaller particles (typically those from about one-fifth to one-half micron in diameter).

Typical smoke alarm testing methods involve exposing a smoke detector to the actual smoke from the selected test materials in a particular way and only passing it if it alarms (or not) as required. As such, they are not perfect tests as the testing smoke, while potentially indicative of the different types of fires identified (nuisance or real), is not necessarily representative of smoke produced by actual fires. Smoke detectors which meet the new standards will still, at some times, produce alarms that occupants consider a nuisance and may not detect a real fire burning a structure as quick as they do in the lab because of what is burning in that particular structure. However, they are believed to provide for a smoke detector product which will be used more (not disconnected) and will react quicker than legacy smoke detectors in dangerous fire situations.

To distinguish between particles of different sizes smoke detectors already use a number of different methodologies. For example, in U.S. Pat. No. 6,011,478, the entire disclosure of which is herein incorporated by reference, different wavelengths of light can be used to attempt to discern particle size by their reflection. This can be effective, but expensive, as multiple types of light sources and either multiple sensors or sensors sensitive to wider spectrums must be used. Further, the results of the reflection need to be calibrated based on the different light wavelengths.

Alternatively, another method that can be performed to determine particle size is to utilize backward scattering and forward scattering of light off the smoke particles. The presence of larger particles typically results in increased forward scattering of incident light. This means that light incident on the particles is scattered at an obtuse angle, between 90 and 180 degrees from the incident source. Smaller particles, however, typically backward scatter the light at an acute angle between 0 and 90 degrees from the source. This phenomenon has been used as a method to determine if smoke contains sufficient backward scattered particles to indicate a real fire. U.S. Pat. Nos. 5,280,272 and 6,218,950, the entire disclosures of which are herein incorporated by reference, provide for examples of smoke detectors which utilize the principal of backward scattering of smoke to identify real fires.

SUMMARY OF THE INVENTION

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, there is described herein, among other things, a smoke detector which utilizes two typically identical light sources and a single sensor to compare the ratio of forward and backward scattering smoke present in a detection area.

There is described herein, in an embodiment, a smoke detector comprising: a housing enclosing a testing space; a first light mount directing light from a first light source at a target point in said testing space; a second light mount directing light from a second light source at said target point in said testing space; and a sensor for detecting light scattering from particles in said testing space; wherein light from said first light source which scatters from said particles at an acute angle is received at said receiver; wherein light from said second light source which scatters from said particles at an obtuse angle is received at said receiver; and wherein said acute angle and said obtuse angle are in different planes.

In an embodiment of the smoke detector, the first light source and said second light source produce generally the same wavelengths of light.

In an embodiment of the smoke detector, the wavelengths of light are in the infrared (IR) spectrum.

In an embodiment of the smoke detector, the first light source and said second light source alternatively illuminate said particles in said testing space.

In an embodiment of the smoke detector, the acute angle is between about 45 and about 65 degrees.

In an embodiment of the smoke detector, the acute angle is between about 50 and about 60 degrees.

In an embodiment of the smoke detector, the acute angle is about 55 degrees.

In an embodiment of the smoke detector, the obtuse angle is between about 110 and about 150 degrees.

In an embodiment of the smoke detector, the obtuse angle is between about 120 and about 140 degrees.

In an embodiment of the smoke detector, the obtuse angle is about 135 degrees.

In an embodiment of the smoke detector, the acute angle is less than half of said obtuse angle.

There is also described herein, in an embodiment, a method of determining a type of smoke, the method comprising: directing light from a first light source at a target point in said testing space; directing light from a second light source at said target point in said testing space; detecting light scattering from particles in said testing space; determining a first amount of light from said first light source which scattered from said particles at an acute angle; determining a second amount of light from said second light source which scattered from said particles at an obtuse angle; and calculating a ratio of said first amount to said second amount.

In an embodiment, the method further comprises initiating an alarm state when said ratio is above a predefined threshold.

In an embodiment, the method further comprises initiating an alarm state when said ratio is above a predefined threshold and said first amount is above another predefined threshold.

In an embodiment, the method further comprises calculating a total amount which is a sum of said first amount and said second amount.

In an embodiment, the method further comprises initiating an alarm state when said ratio is above a predefined threshold and said total amount is above another predefined threshold.

In an embodiment of the method, the first light source and said second light source produce generally the same wavelengths of light.

In an embodiment of the method, the wavelengths of light are in the infrared (IR) spectrum.

In an embodiment of the method, the acute angle is about 55 degrees.

In an embodiment of the method, the obtuse angle is about 135 degrees.

In an embodiment of the method, the acute angle is less than half of said obtuse angle.

DETAILED DESCRIPTION OF PREFERRED EMBODIMENTS

FIGS. 1-4 provide for various depictions of an embodiment of a smoke detector which is designed to use forward and backward scattering of light and particularly infrared (IR) light to detect real versus nuisance fires as contemplated herein. It should be recognized that these pictures are not comprehensive of the possible configurations which can be built in accordance with the principles discussed herein but provide a useful illustration thereof.

It should be further recognized that the terms "real" fire and "nuisance" fire as used herein are somewhat abstractions and are based on current and proposed smoke detector certification standards (specifically UL 217 and UL 268 (7$^{th}$ Edition) as well as NFPA 72). While these terms will be used to discuss when and if the smoke detectors and methods of smoke detection discussed herein should issue alarms, the present smoke detectors and methods are instead more accurately considered as designed to react to the presence of particles within certain size ranges differently. Specifically, the systems and methods relate to the detection of the presence of larger particles (between about on-half and about one micron in diameter) and/or smaller particles (between about one-fifth and about one-half micron in diameter) regardless of composition of the particles. The particles are typically provided in air or another gas.

Further, while the present specification will generally utilize the term "smoke detector" to refer to the smoke sensing systems or devices herein, it should be recognized that what is referred to herein as a "smoke detector" may be a smoke detector or a smoke alarm in common industry parlance. Thus the term "smoke detector" as used herein effectively means a "smoke sensor" which may or may not be incorporated into other systems, stand-alone, or may include other capabilities or systems, to produce a resultant sensing, detecting, or alarm system.

Figure 1:
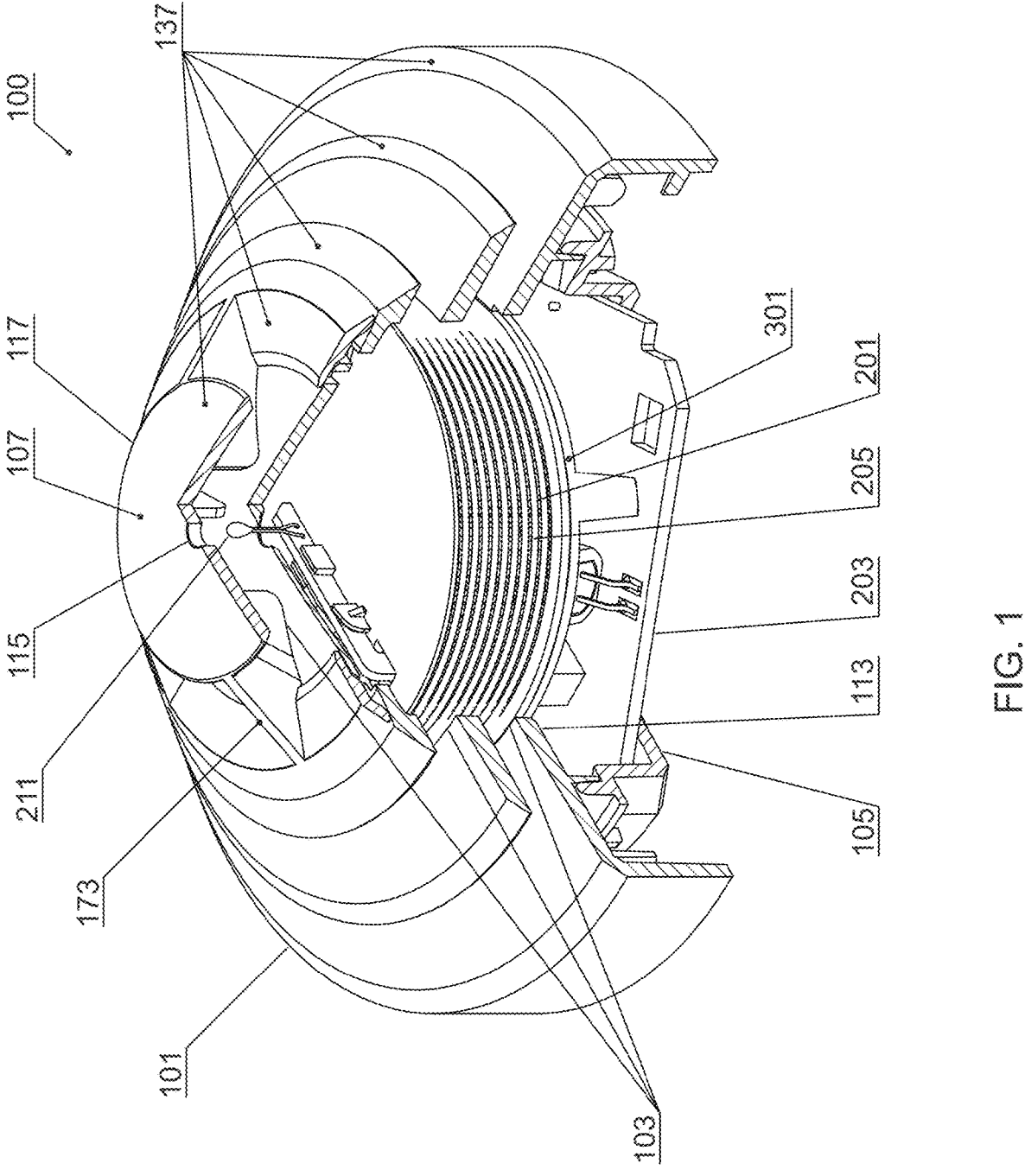
FIG. 1 provides a drawing of a smoke detector with the housing partially sectioned to show arrangement of interior structure.

FIG. 1 provides an embodiment of a smoke detector (100) which utilizes the methods of smoke detection discussed herein. The smoke detector (100) comprises a housing (101) which has been partially sectioned in FIG. 1. The housing (101) will typically comprise a plastic or similar material which serves to enclose the operational components of the smoke detector therein. The housing (101) will typically be loosely in the form of a circular pyramid frustum as smoke detectors are typically circular but this is by no means required and the housing may be of any shape.

While serving to enclose the other components, the housing (101) will be designed to not fully encase the other components but to allow surrounding gases (e.g. air) to enter the housing (101). This allows for smoke particles, which, if present, will be carried in surrounding environmental air, to enter the housing. In the embodiment of FIG. 1, the housing (101) is formed of a series of co-axial disks (137) decreasing in diameter from the base (105) to the top (107) of the housing (101). The disks may be connected via supports (173) which hold them in position relative to each other or may be attached to other components of the smoke detector (100) to provide similar functionality. The disks (137) are separated from each other along their co-axial axis to form slots (103) which will allow air, and thus smoke, to enter the housing (101). The housing (101) of FIG. 1 is simply a typical exemplary housing and may be replaced by other housings having other shapes as would be understood by those of ordinary skill in the art.

The housing (101) in FIG. 1 is, however, designed to make use of the arrangement of the optical detectors that will be discussed later. The housing (101) is designed to be attached to a ceiling or wall via connectors (not shown) which would be on the base (105) of the housing (101). These connectors can enable the housing to be screwed or otherwise joined into a compatible outlet box or to be attached directly to a ceiling or wall with screws or nails. Typically, the base (105) of the housing (101) will be sized and shaped to connect with a mounting ring or similar structure to enable the smoke detector (100) to be repeatedly attached and removed to the wall or ceiling without damage. In most cases, the smoke detector (100) will be configured to be attached to a ceiling with the base (105) generally parallel to the ceiling.

The circular pyramidal frustum shape of housing (101) provides that the slots (103) are arranged to allow for air to flow into the housing which is moving generally parallel to the wall or ceiling upon which the smoke detector (100) is mounted. Specifically, the slots (103) provide for relatively unimpeded flow of air toward the detector component (201) and into the testing area (207) through the housing (101). While the slots will allow for air to enter the housing (101)

from virtually any direction (except through the ceiling as the ceiling presents a solid mounting surface) the slots (103) specifically provide that the greatest flow into the housing (101) is that of air which is moving generally parallel to the ceiling (or wall) upon which the smoke detector (100) is mounted.

It is known that smoke will typically rise to the ceiling of a structure and then move across the ceiling as smoke is typically hotter than surrounding atmospheric air and rises to the highest point available via convection currents. Further, convection and other currents within a room will serve to move the smoke around and, thus, smoke will typically move most heavily across the ceiling of any structure in the event of a fire within or of the structure.

The housing (101) serves to enclose the detector component (201) which provides the functionality of the smoke detector (100). In the depicted embodiment a circuit board or similar support (203) is generally positioned at or near the base (105) of the housing (101). This provides it with plenty of space to support electronic components and also can allow easy access to batteries or other power connections (not shown) when the smoke detector (100) is removed from the wall or ceiling. As can be seen in the embodiment of FIG. 1, the slot (103) closest to the base (105) is generally positioned so as to place it generally coplanar with the lowest part of the insect grid (205).

Thus, air (and smoke) which enters the housing (101) via any of slots (105) will typically have a short path into and through the insect grid (205) and into the testing area (207) without flowing over the circuit board (203). The housing (101) may also be positioned so as not to allow any substantial air flow to go between the optical support (301) and the circuit board (203). This can be seen by the close proximity to the largest disk (113) of the housing (101) to the chamber bottom (303) of the optical support (301).

Figure 2:
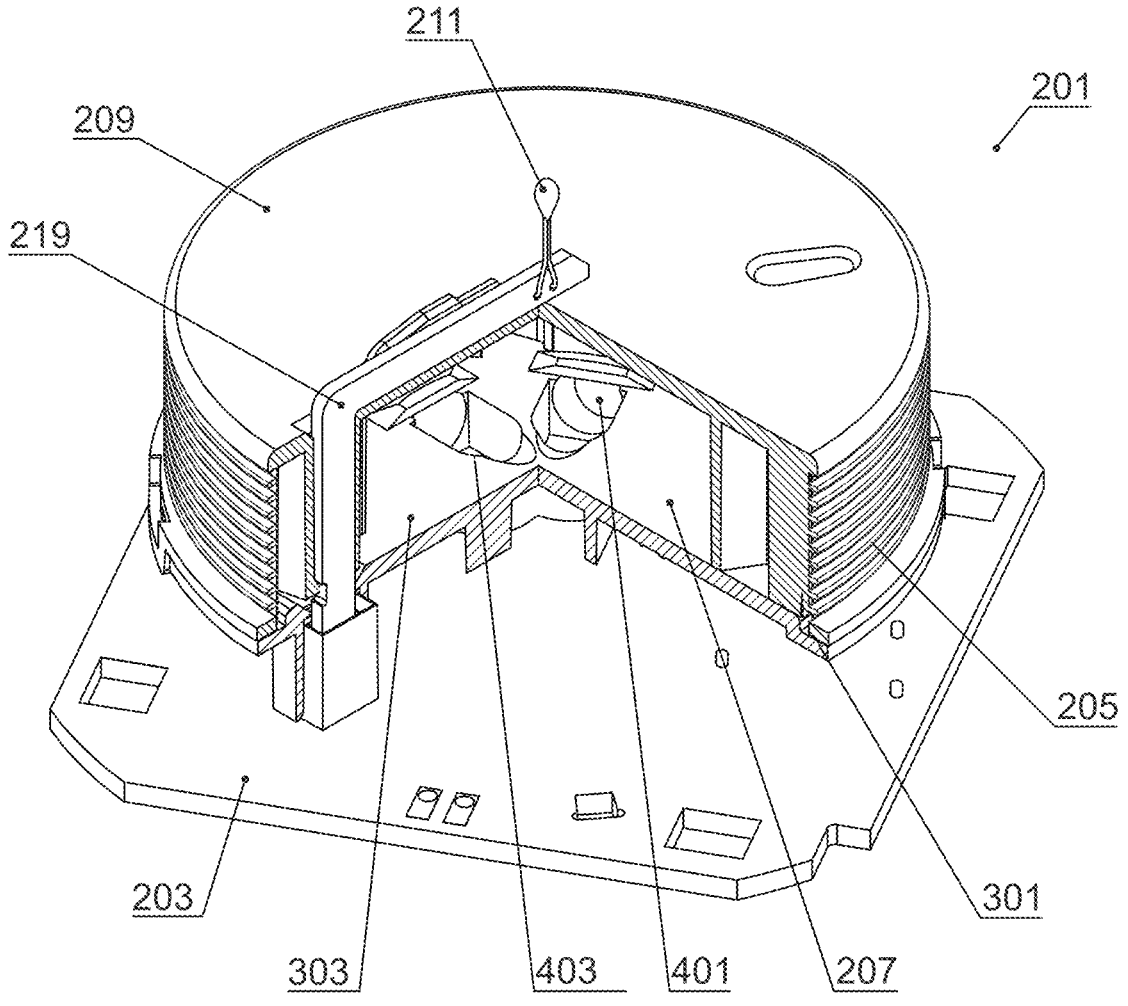
FIG. 2 provides a drawing of the detection component of the smoke detector of FIG. 1 partially sectioned.

FIG. 2 provides additional detail on the layout of the detector component (201). In this FIG. 2, the housing (101) has been removed and the detector component (201) has now been partially sectioned to show additional detail. Specifically, the top of the optical support (301) where the cutouts (403) and (401) are present is now visible. As can be seen in FIG. 2 the insect grid (205) surrounds a volume which is the testing area (207).

The insect grid (205) is typically a thin grid, grille, or other structure which includes small openings of sufficient size to allow smoke particle and air passage, while typically being too small to allow for an insect or other small airborne organism, as well as larger dust particles, to pass into the testing area (207). The insect grid (205) is positioned around a periphery of the optical support (301) and has a top (209) which, in conjunction with the optical support (301) and the insect grid (205), defines and effectively encloses the testing area (207).

The optical support (301) is typically positioned via its attached legs (703) to the circuit board (203). The top (209) may include a visible light indicator such as light emitting diode which extends upward from the top (209) and can be visible through a hole through the smallest disk (117). The light typically will be illuminated or flash to indicate that the smoke detector (100) has power and is operating. There may also be included a thermal sensor (211) present behind hole (115) in the disk (117) which may serve to detect exposure of the smoke detector to increased heat the presence or lack of which may factor into the smoke detector's (100 output and any decision to initiate an alarm state. Power may be supplied to the sensor (211) via bus (219).

Figure 3:
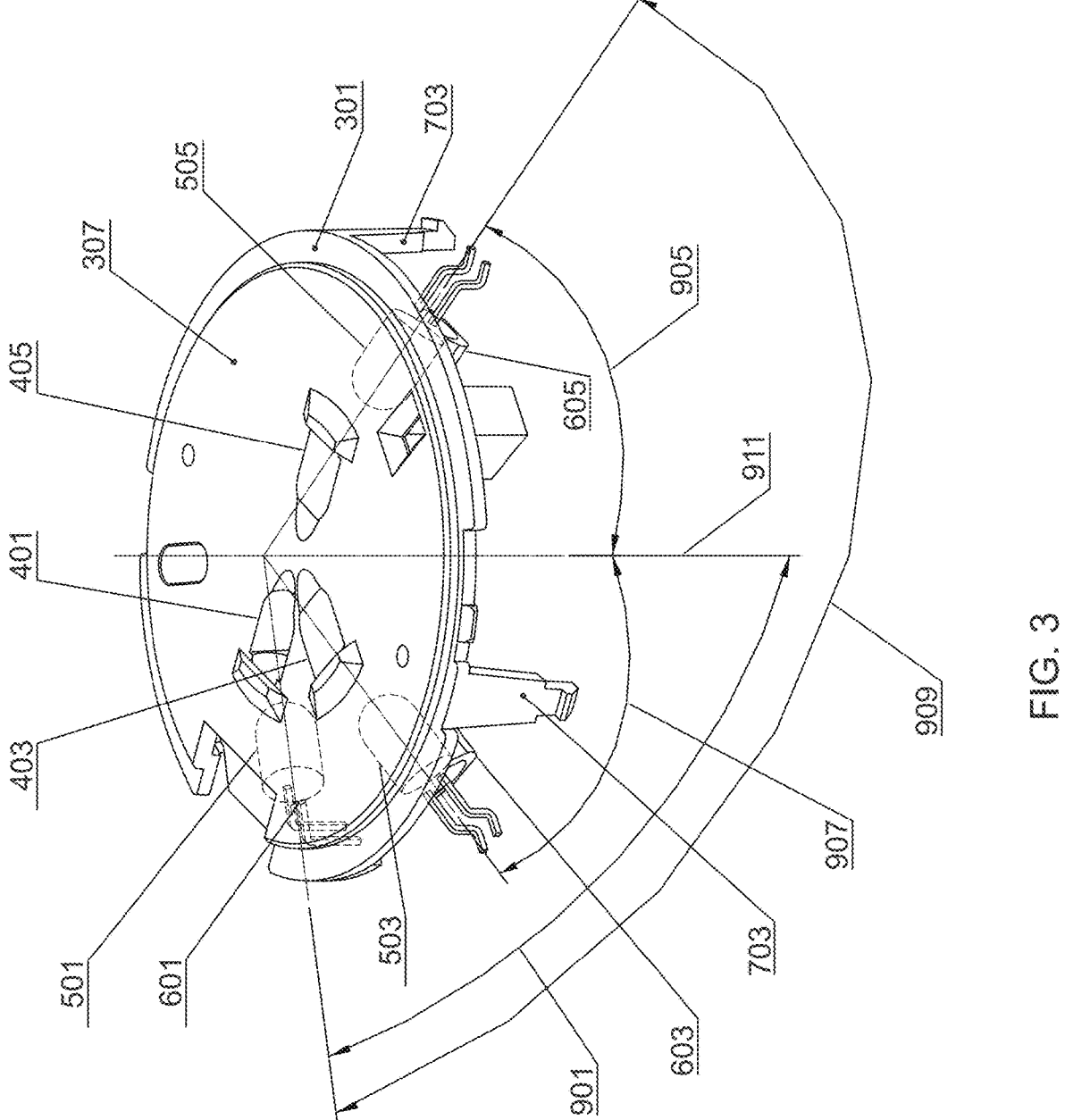
FIG. 3 provides a perspective drawing of the optical support component of the smoke detector of FIG. 1.
Figure 4:
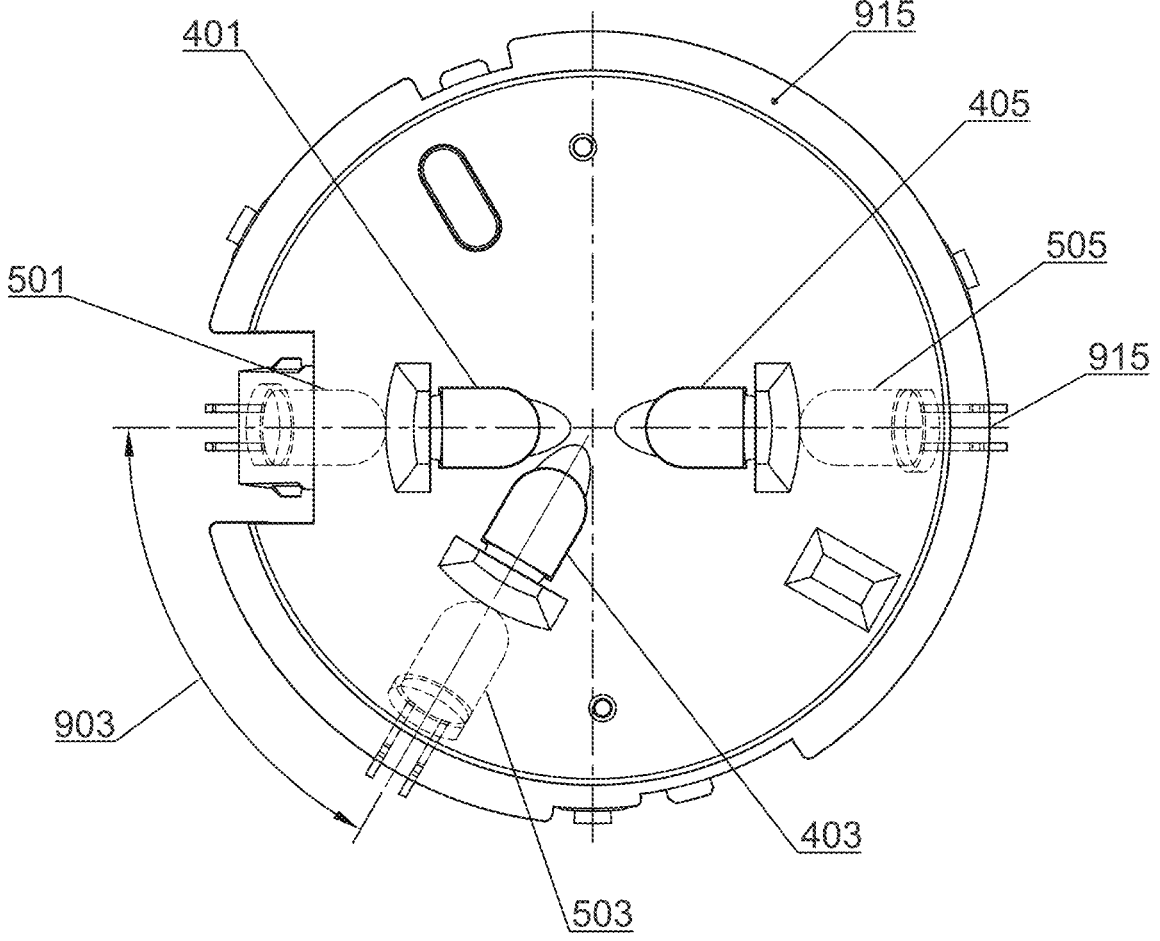
FIG. 4 provides a top down drawing of the optical support component of FIG. 3.

FIGS. 3 and 4 provide for images of the optical support (103) removed from the other components so as to illustrate the location of the various optical components. As can be seen in FIGS. 3 and 4, the optical support (301) is formed of a primary disk (307) with a plurality of legs (703). The legs (703) serve to provide a space under the disk (307) and separate the disk (307) from the circuit board (203) which can allow electronics to be mounted on the circuit board (203). The disk (307) includes three cutouts (401), (403) and (405). These cutouts (401), (403), and (405) can comprise angle tubes through and under disk (307) which act as light channels and will direct light which is incident on the cutouts (401), (403), and (405) toward their ends.

Under the disk (307) there are arranged three mounting brackets (601), (603) and (605). The brackets (601), (603) and (605) are designed to hold the respective optical elements of the smoke detector (100). In particular, bracket (601) will hold a photo receiver (501), while brackets (603) and (605) hold light sources (503) and (505). It should be apparent that the presence of the brackets (603) and (605) and the cutouts (403), and (405) provide that light from the sources (503) and (505) will be primarily directed into the testing area (207) above the disk (301) in the form of a beam. At the same time the presence of bracket (601) and cutout (401) provide that light directed from the testing area (207) toward the sensor (501) will be incident on the sensor (501) while light which is not incident on the sensor (501) will be absorbed or reflected by disk (301) or other components.

The light sources (503) and (505) are typically light sources in the infrared (IR) spectrum and will typically comprise IR light emitting diodes (LED) or similar technology. The receiver (501) is a standard photo receiver which is sensitive to the spectrum of IR light produced by the sources (503) and (505). Typically, the light sources (503) and (505) will be identical components each of which would produce what would be considered generally the same spectrum of light. Thus, light from either source (503) or (505) should be detected at generally the same rate at sensor (501) if the same intensity of light from either source (503) or (505) is received at sensor (501).

As can be best seen in FIG. 3, the sources (503) and (505) as well as the receiver (501) are positioned in the brackets (603), (605) and (601) so that they are under the disk (307). The brackets (603), (605), and (601) as well as the disk (307) itself therefor serve to shroud the sources (503) and (505) and the receiver (501) except toward their ends which are effectively directed toward the cutouts (401), (403) and (405). The cutouts (401), (403), and (405), thus, act in some respects like a light guide to direct light from the sources (503) and (505) into the testing area (207) in the typical form of a beam as discussed above.

Because the light from sources (503) and (505) is in the form of a beam going into the testing area (207), the light can be considered to have linear qualities even though it is not laser light or similar forms of light. As a simplified abstraction, this means that light from sources (503) or (505) can be expressed as a vector incident on a point in the testing space (207) and light reflected from that point which is received at sensor (501) can also be represented as a vector from that point to the sensor (501). This allows for the system to detect light reflected at specific angles from particles as discussed later in this disclosure.

In the event that there are smoke or other particles of material in the testing area (207), the smoke particles will typically serve to scatter (reflect, refract, or otherwise deflect) the light from sources (503) and (505). As was discussed above, smoke which is from a nuisance fire having larger particles will typically cause light to be forward scattered while light impacting on smoke from a real fire with smaller particles will typically be backward scattered. Detection of forward and backward scatter is accomplished via the position of receiver (501) relative to the respective source (503) or (505).

Let us first look at the relationship of receiver (501) to light source (505). As can be best seen in FIG. 4, the openings (401) and (405) are generally arranged to be in line with each other when one looks at their position on the disk (301). However, as both the sensor (501) and light source (505) are positioned under the disk (301) and at an angle to it, the light incident on sensor (501) and the light produced by light source (505) are not actually in line with each other. Thus, the image from FIG. 4 illustrates that they are in the same plane (being a plane perpendicular to the paper of FIG. 4), but are actually arranged at an angle to each other. Thus, without any material to reflect or refract light in the testing area (207), light from the source (505) will not be detected by sensor (501).

In FIG. 3 a center axis (911) is provided which illustrates the center axis of the disk (301) (and the axis of the disks (137) as well). The angle (905) indicates the angle that the source (505) has to this axis (911). The angle (901) shows the angle of the sensor (501) to this axis. The sum of these angles (901) and (905) provides the angle (909) of the source (505) light to the receiver (501). This angle (909) will typically be greater than 90 degrees and less than 180 degrees and is thus an obtuse angle in the plane (915) in FIG. 4. This angle (909) is preferably between about 110 and about 150 degrees, more preferably between about 120 and about 140 degrees and more preferably about 135 degrees. It should be recognized that for ease of manufacture, it is preferred that the angle (905) and the angle (901) be generally the same or similar with the axis (901). Thus, it is typically preferred that the angle (905) and the angle (901) be about 55 to about 75 degrees, more preferably about 60 to 70 degrees and more preferably about 67 to about 68 degrees.

One concern with arranging the sensor (501) and light (505) at angle (909) is that a certain minimum distance is typically required to allow for the openings (405) and (401) to be positioned in the disk (301) and not intersect. Basically, as the angle (905) or (901) becomes larger, the openings (401) and (405) will typically need to become longer to correctly direct the light beam from the source (505) to the target point and from the target point to the sensor (501). If openings (405) and (401) intersected, it is possible for light from source (505) to be received at receiver (501) without it having entered the testing area (207). This need to distance the cutouts (401) and (405) as well as the available space on disk (301) and the sizes of the sensor (501) and light (505) can influence the selection of angle (909).

As the angle (909) is an obtuse angle while each internal angle (905) and (901) is an acute angle, light from the source (505) which is forward scattered by material in the air positioned around the axis (901) will be generally be directed to the receiver (501) while if there is no material in the testing area (207), the light will simply impact on the top (209) where it may be reflected away from the receiver (501) or may be absorbed by the material of the top (209). Thus, should there be larger particles (e.g. from a nuisance fire) in the testing area (207) around the axis (901), the light from source (505) should be reflected toward the receiver (501).

It should be recognized that the angle of reflection of light from source (505) by any particular particle in the testing area need not be exactly angle (909) to be incident on sensor (501) and, in fact, a range of angles of light reflected from such particles will practically be incident on sensor (501). However, it should be recognized that most light from source (505) which is detected by sensor (501) will typically be reflected, refracted, or otherwise scattered by particles in the testing area (207) at around the angle (909) so as to give the angle (909) relevant meaning for detection as would be understood by one of ordinary skill in the art.

Let us turn now to source (503). It should first be apparent from FIG. 4, that the source (503) is coplanar with the sensor (501) so long as angle (907) is generally the same as angle (901). However, the plane which contains both sensor (501) and light (503) is a different plane from that which contains source (505) and sensor (501). Further, the two planes are not generally perpendicular or parallel with each other. Instead, the planes are offset to each other. As can also be best seen in FIG. 4, within their plane, the source (503) and sensor (501) are arranged at the angle (903) to each other.

As opposed to the angle (909) which relates to the positioning of the source (503) and sensor (501) relative to the plane of the disk (301), the angle (903) relates to the source's (503) and sensor's (501) relative positioning within the disk (301) and is independent of the angle (907) or (901) that either source (503) or sensor (501) is positioned in relative to the disk (301). This angle (903) is generally an angle between 0 and 90 degrees and is thus an acute angle. It is preferably less than the angle (901), (905) or (907) and is preferably between about 45 and about 65 degrees, more preferably between about 50 and about 60 degrees, and more preferably about 55 degrees.

One concern with angle (903) is that a certain minimum angle is typically required to allow for the openings (403) and (401) to be positioned and not intersect which is also dependent on the size of source (503) and sensor (501) and the angles (901) and (907). If openings (403) and (401) intersect, it is possible for light from source (503) to be received at receiver (501) without it having entered the testing area (207).

Angle (903) needs to be an acute angle for purposes of detecting light from the source (503) which is backward scattered by material in the air in the testing area (207) and positioned around the axis (901). If such light from source (503) is backward scattered by material in testing area (207), it will be generally directed to the receiver (501). Meanwhile, if there are no particles in the testing area (207), the light from source (503) will simply impact on the top (209) where it may be reflected away from the receiver (501) or may be absorbed by the material of the top (209). Thus, should there be smaller particles (e.g. smoke from a real fire) in the testing area (207) around the axis (901), the light from source (503) should be backward reflected toward the sensor (501) and detected.

It should be apparent from the above, if there is smoke from a fire present in testing area (207) the type of scattering which will occur from the sources (503) and (505) to the sensor (501) will be dependent on the type of smoke present. In particular, if there are larger particles (indicating a nuisance fire) there will be increased light from source (505) incident on the sensor (501) while if there are smaller particles (indicating a real fire) there will be increased light from source (503) incident on the receiver (501).

It should be apparent that to detect which type of fire is generating the smoke, it will typically be necessary to be able to identify the source (503) or (505) of the light incident on sensor (501). This may be accomplished in a number of different ways. In a first embodiment, the wavelengths of sources (503) and (505) may be sufficiently different that the receiver (501) can distinguish reflections from the source (503) from the source (505). While this is possible, it is generally preferred for ease of manufacture that the two sources (503) and (505) be generally of the same design.

In an alternative embodiment, the system (100) will include control electronics to control when the sources (503) and (505) are on. Specifically, the two sources (503) and (505) may be altered in their on/off state so that only one of them is on at any given time and illuminates the testing area. The sources (503) and (505) can then quickly cycle through being on and off (e.g. they both flash) alternatively. In this way, the sensor (501) would only receive light from one source (503) or (505) at a time. While light from the two light sources (503) and (505) acting this way will technically not be incident on quite the same air and particles as the incident light form each source (503) or (505) is temporally spaced, as both source (503) and (505) can be aimed at a common aiming point and produce beams having actual cross sectional dimension (e.g. they are not mathematical lines), if they are cycled sufficiently quickly, the target material upon which they are incident will remain the same in practical application through both light (503) and (505) illuminations.

Once the methodology for determining how to segregate reflected light at reflector (501) from source (503) versus that from source (505), one can then use the source (503) or (505) to determine the nature of the fire and the smoke detector (100) can determine if an alarm situation is appropriate or not. In order to perform the analysis, there will typically be a processor or computer which receives the signals from receiver (401). The processor may be present on the circuit board (203) or there may be a transmitter or other device on the circuit board (203) which may act to transmit the information to a remote computer or processor via any methodology known to one of ordinary skill in the art. The location of the processor or computer and its nature will typically depend, at least in part, if the smoke detector is designed to be a self contained smoke alarm, or not. It should be recognized that the alarm components of a smoke detector and how to generate alarms in response to smoke detection at a smoke detector are well understood by those of ordinary skill in the art and the detector (100) may include or be connected to any form of alarm system which is activated by the processor or detector determining that an alarm condition is appropriate.

Processing of the data to determine if an alarm situation is appropriate, however, may take several different forms. In a first embodiment, the amount of forward and backward scattering is simply used as an absolute number and is compared against a threshold for determining if a fire is present. In this embodiment, the total amount of backward scattering may be measured and if this is above a threshold amount, an alarm may be triggered. Similarly, a total amount of scattering (forward and backward) may be used and compared to a threshold.

In a preferred embodiment, however, the ratio of forward to backward scattering may be used. This methodology is typically preferred as it takes into account a number of variables about the smoke and does so simply without the need for complicated calculations. For example, a nuisance fire may produce a relatively heavy amount of smoke, particularly if the detector (100) is near a kitchen or the source of the smoke. While this smoke will typically include a large amount of larger particles, it will also include some smaller particles. As such, if a raw threshold on the amount of small particles is used, a smokier nuisance fire may generate enough total smoke to produce substantial backscattering as well as forward scattering.

However, as should be apparent, as the smoke from a nuisance fire gets thicker, it will often be the case that the large particle amount will increase faster than the small particle output. This is, for example, because a flaming fire may produce more smoke than a smoldering fire will produce while it will typically also produces many more larger particles than a smoldering fire. Thus, even as the backscattering increases due to the increased amount of smoke, the forward scattering can increase to a greater degree. Use of a ratio takes this into account and therefore detects more the composition of the smoke than any absolute property. This can assist in detecting fire that has a heavy mix of both larger and smaller particles which is to be expected of a fire consuming a large number of different fuels. As contemplated previously, any smoke analysis may also be combined with readings from heat sensor (211) to further improve detection granularity.

In an actual fire situation, it can be the case that what is first detected as a nuisance fire becomes a real fire. For example, someone could have fallen asleep with food cooking on the stove. In this case, the fire would begin as burning food. However, that flame may then catch nearby materials in the kitchen. Testing of smoke alarms can also take this into account where the alarm is expected to not alarm for a window of time when exposed to cooking smoke, but is expected to alarm within another window of time not when exposed to a combination of the two smoke types. The use of the ratio of smaller to larger particles can assist in this type of detection. In such a situation, the ratio of backscattered light will increase due to the new fuel being added and the change in smoke composition will show changes in the ratio which can be detected. Further, it will typically do this even as the smoke gets thicker.

In addition to comparing the ratio of incident light, other criteria can also be used. For example, the smoke detector may alarm if a sufficiently high ratio of backscattered light (indicating smaller particles compared to larger particles) is achieved on its own. The smoke detector may also be used to trigger an alarm if a total amount of either or both backscattered or total scattered light is received even if the ratio is not considered sufficiently high. This can be used to present an alarm where smoke is thick and an alarm may be appropriate as the fire is likely a real fire, even if occupants are already aware of it. Similarly, the smoke detector could not alarm if the ratio is sufficiently high, but the total reflection amount (either if both forward and backscattered light or backscattered light alone) is not sufficiently high. This can be used to resist an alarm situation in the event that there is combustion detected which could be indicative of a smoldering fire, but the amount does not seem to be indicative that the fire is either uncontrolled (e.g. it is a nearby candle) or is nearby (it is a forest fire in the distance). In a still further embodiment, other factors related to the ratio can be used. For example, changes in the ratio and/or the speed of changes in the ratio can be used to trigger the alarm situation. This can be used to indicate a changing nature of fire. For example, that a smoldering fire has now resulted in a flaming fire. Additional sensor outputs (such as heat sensor (211)) may also be combined with the smoke detection to determine if an alarm condition is appropriate.

It should also be recognized that the triggers for activating the alarm situation may also be adjustable. It may be the case that different smoke detectors constructed in accordance with this disclosure are designed to produce alarm situations at different ratios or at different amount of smoke being detected. This can make smoke detectors which are similarly constructed as discussed above are suitable in different environments or rooms of a structure. Alternatively, the processor or computer may be adjustable to alter the ratio as desired allowing the same smoke detector to be useable in different situations.

While the invention has been disclosed in conjunction with a description of certain embodiments, including those that are currently believed to be useful embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The qualifier "generally," and similar qualifiers as used in the present case, would be understood by one of ordinary skill in the art to accommodate recognizable attempts to conform a device to the qualified term, which may nevertheless fall short of doing so. This is because terms such as "parallel" are purely geometric constructs and no real-world component or relationship is truly "parallel" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A smoke detector comprising:
a housing comprising a top, a base, and a series of co-axial disks separated by supports; wherein the area between the disks forms slots that allow generally unimpeded, planar flow into said housing and through a testing space;
said housing enclosing a detector component, a circuit board, and said testing space;
said detector component further comprising an optical support, said optical support including a generally planar optical support disk and a plurality of legs, wherein said testing space is above said optical support disk;
said optical support disk further comprising a first light mount, a second light mount, and a sensor mount;
said plurality of legs attached to said circuit board to form a gap between said optical support disk and said circuit board, said gap including said first light mount, said second light mount, and said sensor mount;

the first light mount directing light from a first light source through said optical support disk at a target point in said testing space;

the second light mount directing light from a second light source through said optical support disk at said target point in said testing space; and a sensor for detecting light scattering from particles in said testing space;

wherein light from said first light source which scatters from said particles at an acute angle passes through said optical support disk into said sensor mount and is received at said sensor;

wherein light from said second light source which scatters from said particles at an obtuse angle passes through said optical support disk into said sensor mount and is received at said sensor; and wherein said acute angle and said obtuse angle are in different planes.

2. The smoke detector of claim 1, wherein said first light source and said second light source produce generally the same wavelengths of light.

3. The smoke detector of claim 2, wherein said wavelengths of light are in the infrared (IR) spectrum.

4. The smoke detector of claim 1, wherein said first light source and said second light source alternatively illuminate said particles in said testing space.

5. The smoke detector of claim 1, wherein said acute angle is between about 45 and about 65 degrees.

6. The smoke detector of claim 1, wherein said obtuse angle is between about 110 and about 150 degrees.

7. The smoke detector of claim 1, wherein said acute angle is less than half of said obtuse angle.

8. A method of determining a type of smoke, the method comprising:

providing a housing comprising a top, a base, and a series of co-axial disks separated by supports; wherein the area between the disks forms slots;

providing an optical support, a circuit board, and a testing space enclosed within said housing;

said optical support including a generally planar optical support disk and a plurality of legs, wherein said testing space is above said optical support disk;

said optical support disk further comprising a first light mount, a a second light mount, and a sensor mount;

said plurality of legs being attached to said circuit board and forming a gap between said optical support disk and said circuit board, said gap including said first light mount, said second light mount, and said sensor mount;

providing particles from air, smoke, or a combination of air and smoke;

said particles entering said housing in a generally unimpeded planar flow via said slots and flowing into said testing space;

directing light from a first light source through said optical support disk at a target point in said testing space;

directing light from a second light source through said optical support disk at said target point in said testing space;

detecting light scattering from particles in said testing space through said optical support disk and into said sensor mount at a sensor within said sensor mount;

determining a first amount of light from said first light source which scattered from said particles to said sensor at an acute angle in a first plane;

determining a second amount of light from said second light source which scattered from said particles to said sensor at an obtuse angle in a second plane different from said first plane; and calculating a ratio of said first amount to said second amount.

9. The method of claim 8 further comprising, initiating an alarm state when said ratio is above a predefined threshold.

10. The method of claim 8 further comprising, initiating an alarm state when said ratio is above a predefined threshold and said first amount is above another predefined threshold.

11. The method of claim 8 further comprising, calculating a total amount which is a sum of said first amount and said second amount.

12. The method of claim 11 further comprising, initiating an alarm state when said ratio is above a predefined threshold and said total amount is above another predefined threshold.

13. The method of claim 8, wherein said first light source and said second light source produce generally the same wavelengths of light.

14. The method of claim 13, wherein said wavelengths of light are in the infrared (IR) spectrum.

15. The method of claim 8, wherein said acute angle is about 55 degrees.

16. The method of claim 8, wherein said obtuse angle is about 135 degrees.

17. The method of claim 8, wherein said acute angle is less than half of said obtuse angle.

18. The smoke detector of claim 1, wherein said housing further comprises an insect grid that surrounds the periphery of said optical support and defines said testing space.

19. The smoke detector of claim 18, wherein particles from air, smoke, or a combination of air and smoke, enter said housing via said slots and flow through said insect grid and into said testing space.

20. The method of claim 8, further comprising, providing an insect grid surrounding the periphery of said optical support and defines said testing space; wherein said particles enter said housing via said slots and flow through said insect grid and into said testing space.

* * * * *